Jan. 28, 1969  R. C. HUGHES ET AL  3,424,533
SPECTROGRAPHIC ANALYSIS

Filed Feb. 28, 1963

INVENTORS.
RAY C. HUGHES
RADU MAVRODINEANU
BY
AGENT.

3,424,533
SPECTROGRAPHIC ANALYSIS
Ray C. Hughes, Ardsley, and Radu Mavrodineanu, Yonkers, N.Y., assignors to North American Philips Company, Inc., New York, N.Y., a corporation of Delaware
Filed Feb. 28, 1963, Ser. No. 261,773
U.S. Cl. 356—85          3 Claims
Int. Cl. G01n *21/00;* G01j *3/00;* H01j *7/24*

---

ABSTRACT OF THE DISCLOSURE

A method for spectrographically analyzing a specimen by introducing the specimen into an R-F torch employing an atmosphere of hydrogen or helium which permits detection of elements in the specimen with a minimum of background radiation interference.

---

Figure 1:
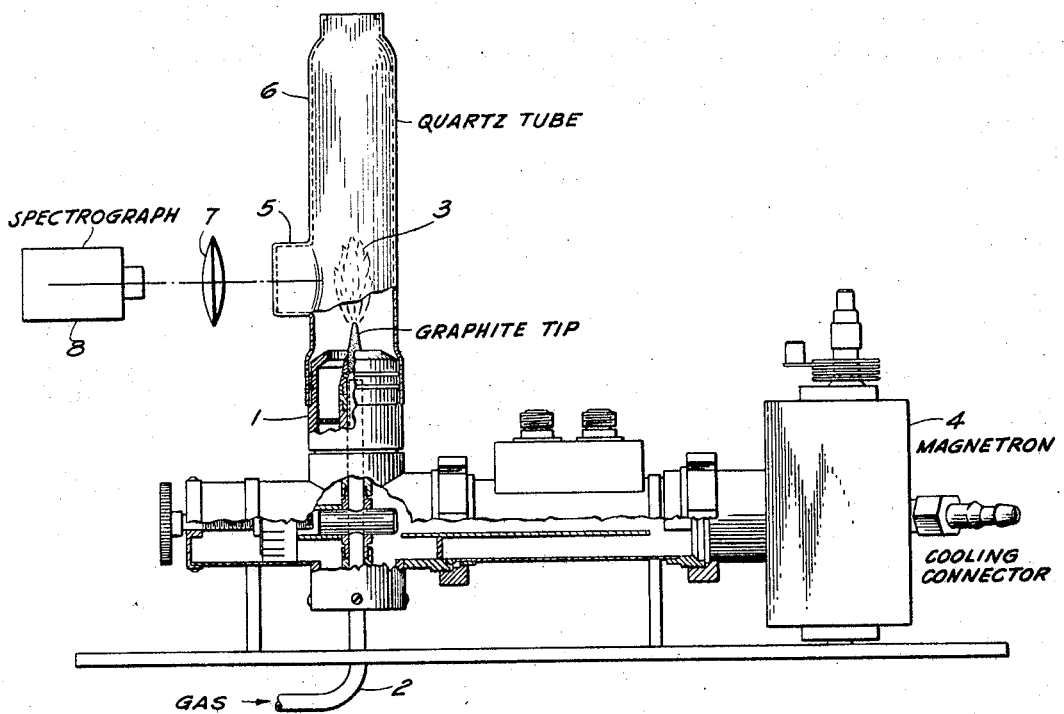

Our invention relates to a method and apparatus for determining the elemental constitution of material by spectrographic analysis.

In the spectrographic analysis of materials, a sample of the material is heated to incandescence, the emitted light resolved and the spectrum thereby obtained is definitive of the elemental constitution of the material. Although there are, various ways in which a material can be heated to incandescence, e.g., in a carbon arc, or by spark, it has been proposed to employ an R-F discharge to excite the spectra of certain gases, and for the excitation of spectra of elements introduced as an atomized solution into the discharge. However, if the R-F discharge is sustained by air, the spectrum produced by air alone is so intense and contains so great a number of lines and bands as to obscure the spectra of other elements introduced into the discharge, for example by atomisation, thus interfering in the sensitivity of detection of the introduced elements and making their identification difficult.

It is a principal object of our invention to provide an improved method and apparatus for spectrographic analysis employing an R-F discharge to excite the spectra of elements introduced into the discharge.

It is a further object of our invention to provide an apparatus for producing an R-F discharge in an atmosphere other than air in order to excite the spectra of elements intoduced into the discharge without obscuring their spectra.

It is a still further object of our invention to provide an apparatus for introducing a material in atomized form into a gaseous atmosphere other than air through which an R-F discharge is produced for the purpose of exciting the spectra of elements in the material.

It is a still further object of our invention to provide for the introduction of solid samples into the R-F discharge, and the consequent excitation of the spectra of such samples.

These and further objects of the invention will appear as the specification progresses.

In accordance with the invention, we introduce a sample of the material into an atmosphere of hydrogen or helium, at atmospheric pressure, in which a radio frequency discharge is produced so that each of the elements constituting the material are caused to emit their atomic and/or molecular radiations. These radiations may be isolated according to their frequencies by means of filters or light dispersing instruments such as a prism or grating spectrograph. Elements or compounds present in the sample can be identified by determination of the frequencies emitted, and measurement of the relative concentrations of various elements or compounds present in the samples by measurement of the intensities of the characteristic radiations, in comparison with the intensities produced by known concentrations of elements introduced for comparison purposes.

The discharge in helium or hydrogen produces an extremely simple spectrum of few lines, leaving the majority of the spectral region from 2,000 to 10,000 angstroms free of interfering lines, bands, or continuous radiation, in contrast to air whose spectrum is so intense and contains so great a number of lines and bands as to obscure the spectra of other elements introduced into the discharge. However, these results obtained with discharges in helium or hydrogen are entirely unexpected, since previous investigations have shown that an R-F discharge in helium is cold, while the production of an R-F discharge in hydrogen at atmospheric pressure has not been obtained.

A variety of means may be employed for introducing the sample into the discharge region and we therefore do not wish to be limited to the specific means hereinafter described which are illustrative only, the invention itself being defined in the appended claims. Solutions, for example, may be introduced by an atomizer which injects the solution into a flowing stream of gas which is employed as the sustaining atmosphere for the discharge. Solid samples are conveniently excited by placing them on an electrode at which the discharge originates.

The invention will now be described with reference to the accompanying drawing.

Figures 2A, 2B, 2C:
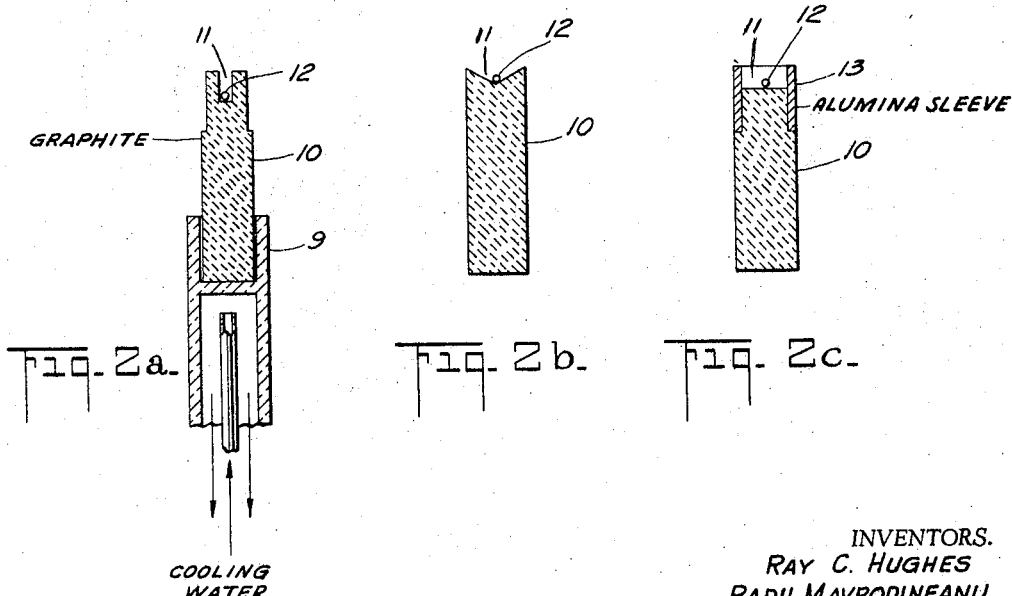
Figure 3:
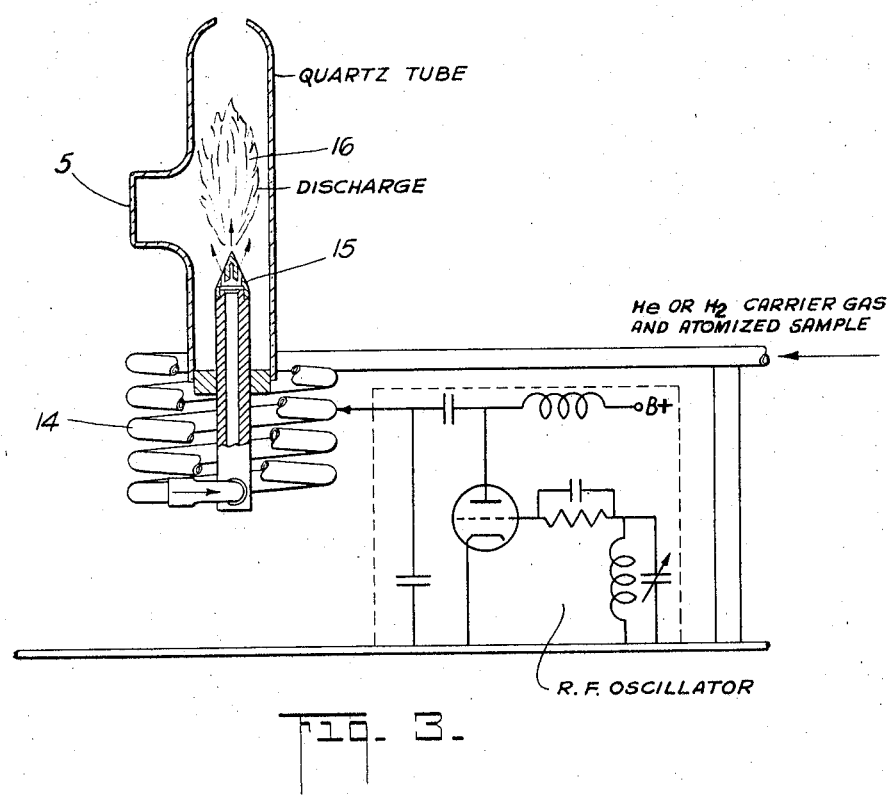
Figure 4:
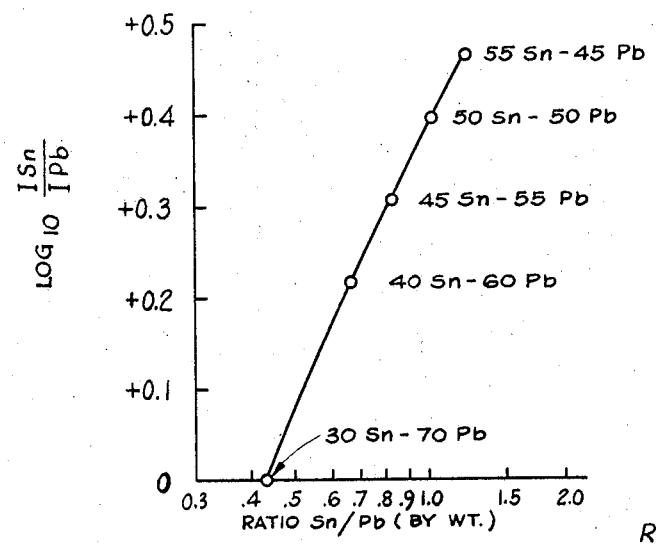

FIG. 1 shows a diagrammatic arrangement of an apparatus according to the invention;

FIGS. 2*a*, *b* and *c* show different embodiments of electrodes for receiving solid samples;

FIG. 3 shows an apparatus for introducing a liquid sample into the discharge; and FIG. 4 is an analytical working curve obtained by the method according to the invention for the analysis of a tin-lead solder.

As shown in FIG. 1, a gas stream flows between the two conductors 1 and 2 of a coaxial system which is connected to a magnetron oscillator. A sample of material is introduced at the end of the inner conductor 2 of the coaxial conductor system where an R-F discharge 3 is produced by R-F energy at 2450 megacycles per second generated by a magnetron oscillator 4, which excites the spectra of elements in the sample. Alternatively, high frequency energy at 30 megacycles per second can be introduced into an induction coil surrounding and connected electrically to a conductor at the end of which the discharge originates. The radiations characteristic of the elements are transmitted through a window 5 of an enclosure 6, the walls of which are constituted of an insulating material such as a ceramic, surrounding the discharge. After emerging from the discharge, the rays are focussed by lens 7 onto a spectograph 8 where they are dispersed into their spectra and recorded.

Samples in solid form are preferrably placed on the end of the center conductor at which the discharge is established. Such samples are heated by the discharge, are vaporized, and brought into the discharge in the form of vapor. Thus, in FIGS. 2*a* and *b*, the inner conductor 2 of the coaxial system is conveniently provided with a recess or cavity 9 into which a graphite tip 10, likewise provided with a suitable recess 11 at its end for receiving and holding sample 12, fits. Alternatively, the end of the graphite tip 10 can be surrounded by an insulating sleeve, as shown in FIG. 2*c*, preferably of alumina, for receiving the sample 12.

For introducing liquid samples in a manner which avoids the creation of liquid electrical leakage paths which tend to partially ground the discharge, we have found it convenient to introduce the gas stream carrying atomized liquid at or near the grounded end of a hollow, tubular, helically coiled conductor 14 as shown in FIG. 3 which constitutes the inductor of the oscillator circuit, and which terminates at the discharge site, and to allow this liquid-laden gas stream to exit into the discharge region through one or more small orifices near the tip 15 forming the discharge site 16.

FIG. 4 shows an analytical working curve for the analysis of tin-lead solder, in the range 30 Sn=70 Pb to 55 Sn=45 Pb, expressed as proportions by weight, which was obtained by vaporizing samples of solders containing the constituents in different proportions as indicated by means of an R-F discharge in a helium or hydrogen atmosphere, dispersing the spectra thus obtained with a Bausch and Lomb Medium Quartz spectrograph, and recording the spectra on Eastman 1N plates. The spectral line intensities of the tin and lead are related to the relative proportions of the two elements present in the sample. The optical density of a suitable line of each element on the photographic plate was measured by means of a densitometer. The relative intensities of the two lines were derived by reference to a characteristic curve (H and D curve) for the particular plate employed. Finally, the line intensity ratio was referred to a calibration curve obtained by use of samples of known composition in order to derive the tin/lead ratio present in the analytical sample.

Alternatively, a characteristic line of each of the two elements may be isolated from all other radiations by any suitable means and the two characteristic lines allowed to impinge upon any suitable radiation detection devices in order to measure the concentration of each element present in the sample. By these general principles, the amount of each of one or more elements introduced into the discharge may be measured as a function of the amounts of characteristic radiation produced, and in a continuous process, the information thus derived may be used to control the process. Thus, for example, the composition of the solder, in the example illustrated, could be effectively controlled by continuoos sampling of the solder as it is formed and by adjusting the flow of the constituent elements to maintain the composition uniform.

Therefore, while we have described our invention with reference to specific embodiments and applications thereof, we do not wish to be limited thereto as other modifications will be apparent to those skilled in this art without departing from the spirit and scope of the invention.

What we claim is:
1. Spectrographic analysis apparatus comprising a hollow enclosure open at one end thereof, means for introducing into said enclosure a gas selected from the group consisting of hydrogen and helium and a volatilized specimen of material, said gas being introduced into the enclosure at atmospheric pressure, and means to produce an R-F discharge in said enclosure of sufficient intensity to heat the gas to a temperature at which said material exhibits spectra characteristic of elements therein.

2. Spectrographic analysis apparatus as claimed in claim 1 in which said means for producing an R-F discharge includes a pair of spaced electrodes one of which is hollow and through which the gas and volatilized specimen is introduced into the enclosure.

3. Spectrographic analysis apparatus as claimed in claim 2 in which the specimen is supported in a graphite holder disposed in the end of said hollow electrode and is volatilized therefrom.

References Cited

UNITED STATES PATENTS

| | | | |
|---|---|---|---|
| 1,971,215 | 8/1934 | Feussner | 88—14 |
| 2,043,053 | 6/1936 | Martin | 88—14 |
| 2,670,649 | 3/1954 | Robinson | 88—14 |
| 2,708,387 | 5/1955 | Broida et al. | 88—14 |
| 2,745,311 | 5/1956 | Touvet | 88—14 |
| 3,025,745 | 3/1962 | Liston | 88—14 |
| 3,048,738 | 8/1962 | Paul | 88—14 |
| 3,242,798 | 3/1966 | Yamamoto | 88—14 |
| 3,188,180 | 6/1965 | Holler | 88—14 |

OTHER REFERENCES

Roddy et al.: "The Radio-Frequency Plasma Torch" an article in Electronics World, February 1961, vol. 65, pp. 29–31 and 117.

Corbine et al.: "The Electronic Torch and Related High Frequency Phenomena," Journal of Applied Physics, volume 22, No. 6, June 1951, pages 835–840.

JEWELL H. PEDERSEN, *Primary Examiner.*

F. L. EVANS, *Assistant Examiner.*

U.S. Cl. X.R.

219—121; 315—111; 356—76, 87; 313—231